United States Patent [19]

DeVorak

[11] Patent Number: 4,466,632
[45] Date of Patent: Aug. 21, 1984

[54] TRAILER HITCH HAVING A WINCH COUPLING ASSIST

[76] Inventor: Dwight F. DeVorak, Rte. 1, Box 268, Hazen, Ark. 72064

[21] Appl. No.: 442,637

[22] Filed: Nov. 18, 1982

[51] Int. Cl.³ .............................................. B60D 1/00
[52] U.S. Cl. .............................................. 280/478 R
[58] Field of Search ................ 280/477, 478 R, 478 B

[56] References Cited

U.S. PATENT DOCUMENTS

| | | | |
|---|---|---|---|
| 2,170,983 | 8/1939 | Adams | 280/478 R |
| 3,848,895 | 11/1974 | Christopher | 280/478 R |
| 4,042,254 | 8/1977 | Allen | 280/477 |
| 4,178,011 | 12/1979 | Kirsch | 280/477 |

OTHER PUBLICATIONS

Article entitled "It's New," published Jan. 1982, Farm Journal–Item No. 35.

Primary Examiner—Joseph F. Peters, Jr.
Assistant Examiner—D. Lynn Fugate
Attorney, Agent, or Firm—Hill, Van Santen, Steadman & Simpson

[57] ABSTRACT

A highway trailer hitch having a trailer connector secured to one end of a cable with the other end of the cable extending through a guide and support sleeve and mounted on a cable drum. A crank powers the cable drum to reel in cable and the attached trailer connector to provide a coupling assist for connecting a trailing vehicle to a towing vehicle.

9 Claims, 7 Drawing Figures

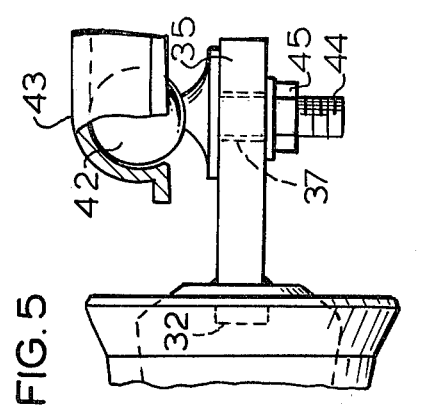
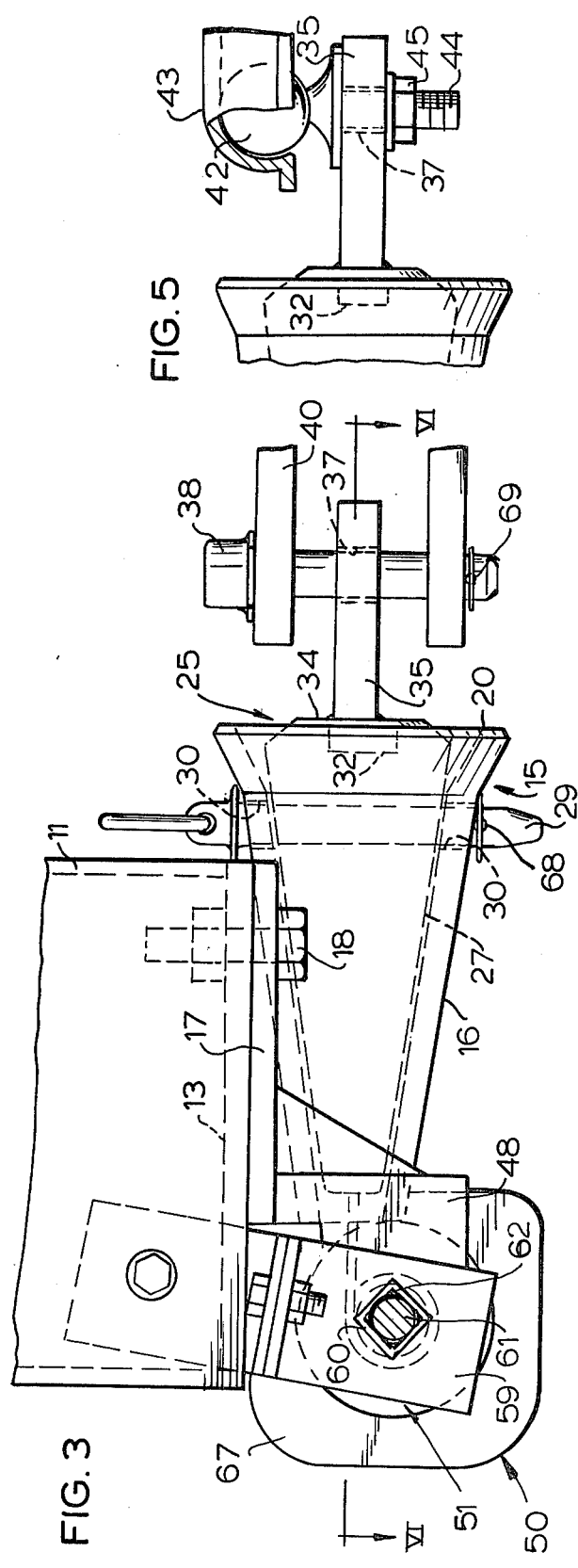
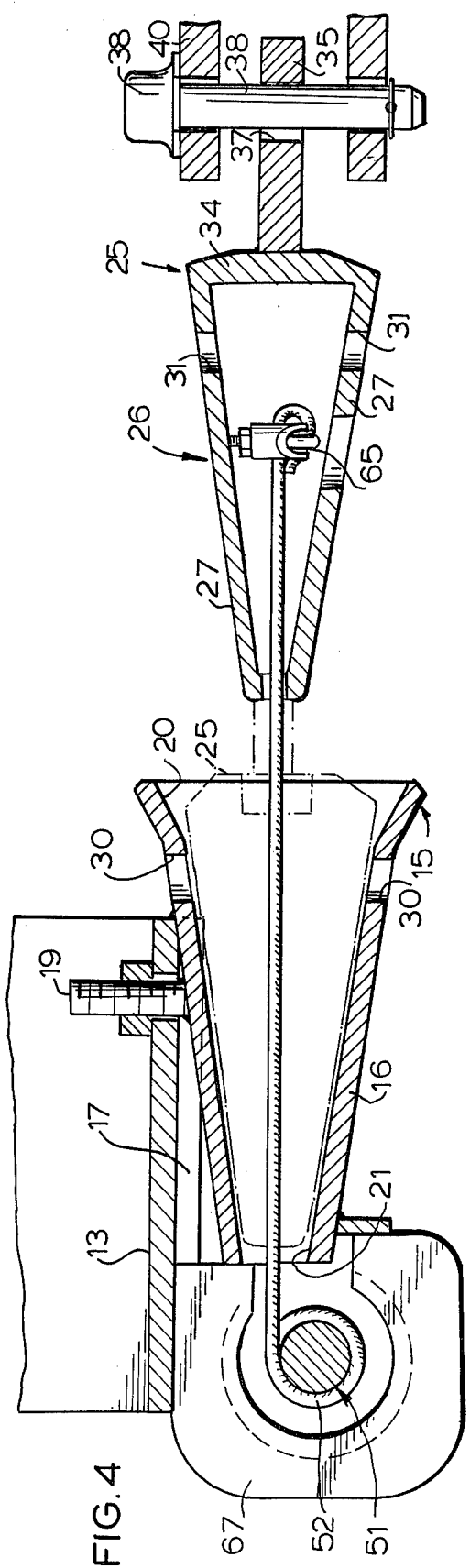

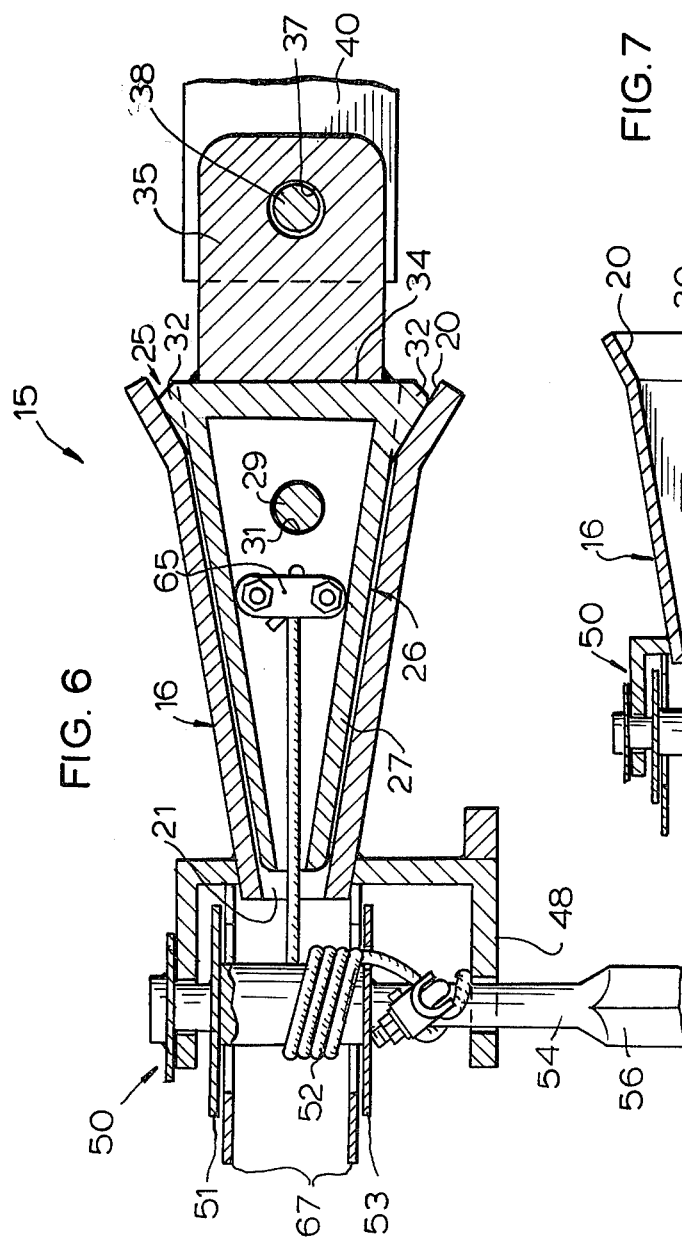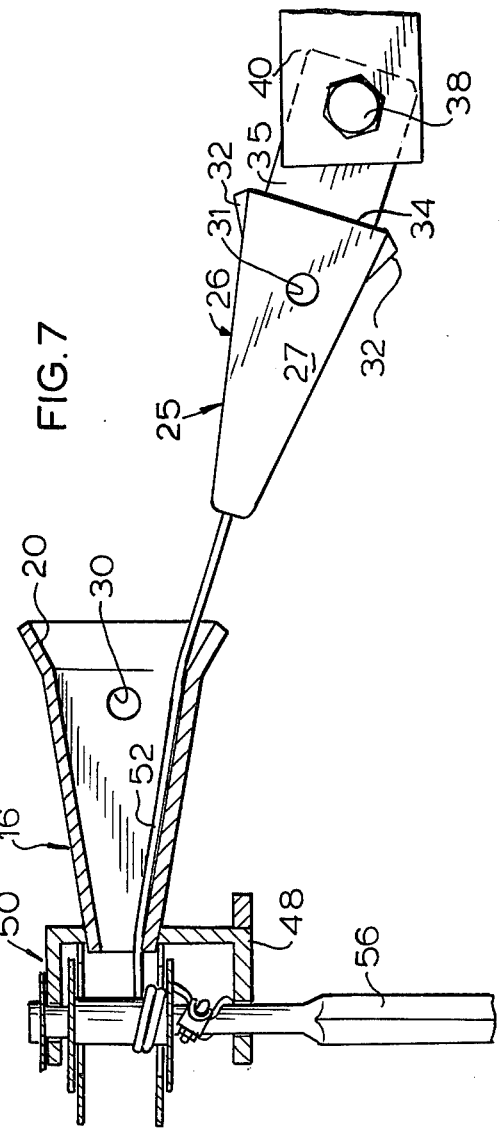

TRAILER HITCH HAVING A WINCH COUPLING ASSIST

BACKGROUND OF THE INVENTION

The field of this invention is directed to a hitch for heavy-duty hauling, and is more particularly concerned with a heavy-duty hitch which provides ease of coupling between a towing and a trailing vehicle without the need of accurate positioning alignment of the vehicles to effect a coupling hitch connection. Trailer hitches commonly used require accurate positioning of the towing vehicle relative to the vehicle being towed, especially when hooking up to a large trailer or implement which cannot be readily maneuvered by hand. A hitch-equipped truck is especially difficult to back up close enough to a trailer to make a hookup without an observer to direct the truck operator. Without an observer to direct the truck driver he is obliged to back the truck to where he believes a coupling connection might be made; since the hitch is out of his field of vision, he must then get out of the truck and check the hitch location. These steps are repeated as often as it takes, until alignment of the hitch and the trailer tow bar are achieved and a coupling pin installed to complete the hookup. If the trailer is relatively lightweight it may be possible to maneuver the trailer to a coupleable location relative to the hitch by hand.

One device which attempted to overcome this problem provided a pivotable drawbar member mounted to a tractor used in combination with a hydraulic cylinder. The hydraulic cylinder is connected to an extendible yoke by means of a flexible cable. Herein, the hydraulic cylinder pays out the yoke which is then connected to a tongue of a trailer. The cylinder is then charged to retrieve the yoke dragging the trailer along and locks it to the tractor drawbar. The drawbar includes a tube section pivotably supported on the frame of the tractor with a socket portion at one end thereof to receive the extendible yoke when retracted.

Hydraulic pressure maintained in the cylinder secures the yoke in a stowed position. Herein, the length of stroke of the hydraulic cylinder limits the distance the yoke can be extended to reach a trailer for hookup and the security of the connection depends on maintaining a suitable hydraulic pressure in the cylinder. Further, the non-rigid support of the drawbar from the tractor precludes the use of a coupler ball connection between the tractor and trailer. Thus, it will be seen that this device is designed only for off-road towing and is not adaptable for general use on highway vehicles or the like.

SUMMARY OF THE INVENTION

This invention provides a trailer hitch which is especially well suited for use on pickup trucks or the like. The hitch includes a drawbar with a bellmouth hitch sleeve bolted to the truck bumper or frame and carries an extendible hitch tongue which is securely nested within the sleeve when towing a trailer or implement. The tongue is attached to one end of a wire rope with the other end of the wire rope reeled around a winch drum member, incorporated into the trailer hitch. When the wire rope is unreeled, the hitch tongue is allowed to be drawn out of the sleeve for coupling to a tow bar of a trailer. The coupling can easily be made, although the trailer is located well behind the truck and off to one side, with the insertion of an interconnecting lock pin. Thereafter, the wire rope is reeled in on the winch drum while the bellmouth sleeve guides the rope and hitch tongue toward an aligning couple.

The winch drum reel is powered by a hand crank to drag the hitch tongue with the attached trailer into a stowed position. Herein, a truncated pyramidal portion of the hitch tongue is brought into nesting engagement with the bellmouth hitch sleeve. A second lock pin provides a positive mechanical towing couple between the tongue and sleeve, forming a rigid tow bar unit. The hitch tongue and trailer tow bar members may be equipped with a coupler ball connection to provide a universal coupling between the truck and trailer well suited for highway travel.

It is a principal object of this invention to provide a simple, heavy-duty trailer hitch which can be easily connected to trailing vehicles compatible with highway haulage.

Another object of this invention is to provide a novel trailer hitch which incorporates a hand-cranked winch to retrieve an extendible coupling tongue after it has been pinned to the tow bar of a trailer.

Yet another object of this invention is to provide a quick connect trailer hitch in which a bellmouth hitch sleeve, secured to the frame or bumper of a truck or the like, is adapted to guide an extendible coupling tongue with a trailer pinned thereto into the bellmouth portion of the hitch sleeve to achieve a rigid trailer hitch.

Still another object of this invention is to provide a quick connect rigid trailer hitch which will accommodate a coupler ball connection to provide a universal connection between a truck and a trailer.

Other objects, features and advantages of the invention will be readily apparent from the following description of a preferred embodiment thereof taken in conjunction with the accompanying drawings, although variations and modifications may be effected without departing from the spirit and scope of the novel concepts of the disclosure.

BRIEF DESCRIPTION OF THE DRAWINGS

FIG. 3 is an enlarged fragmentary vertical sectional view taken generally along the line III—III of FIG. 2;

FIG. 4 is a vertical sectional view taken generally along the line IV—IV of FIG. 2 showing the hitch tongue rearwardly extending from the hitch sleeve;

FIG. 5 is a fragmentary elevational view of an alternate connecting arrangement for use with a ball coupler equipped trailer;

FIG. 6 is a transverse sectional view taken generally along the line VI—VI of FIG. 3; and FIG. 7 is a reduced scale sectional view similar to FIG. 6 but showing the hitch tongue in a rearwardly extended trailer hookup position.

DESCRIPTION OF THE PREFERRED EMBODIMENTS

Figure 1:
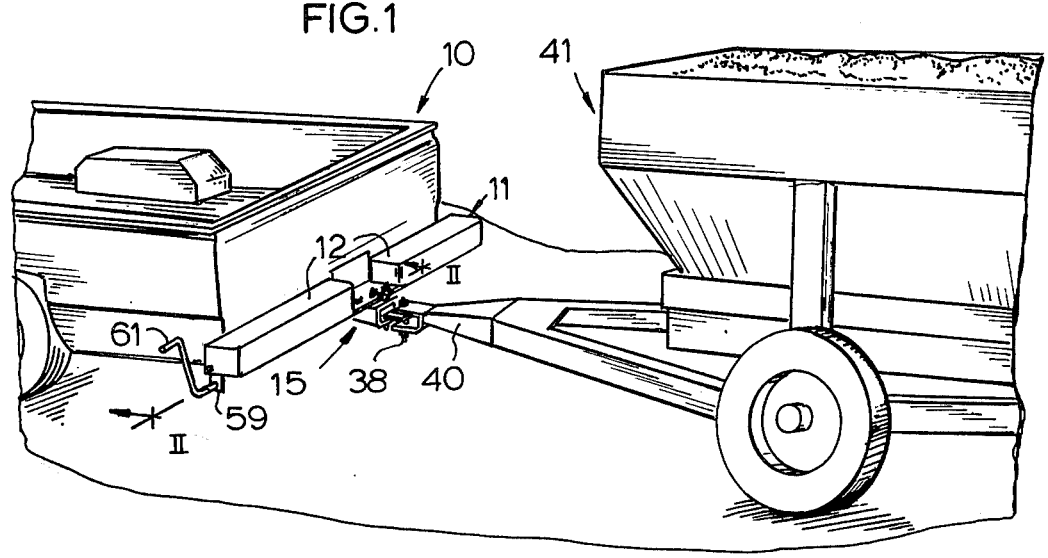
FIG. 1 is a fragmentary perspective view showing the trailer hitch of this invention mounted to the rear bumper of a pickup truck and coupled to the tow bar of a trailer.
Figure 2:
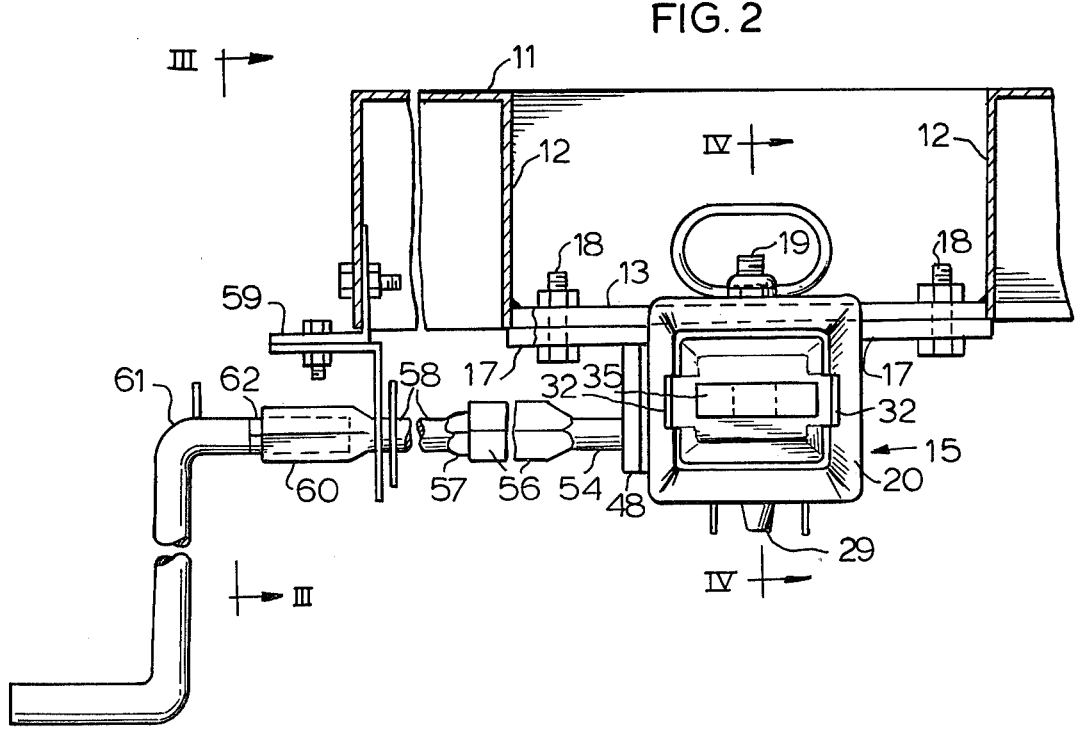
FIG. 2 is an enlarged fragmentary vertical sectional view taken generally along the line II—II of FIG. 1.

As illustrated in FIG. 1, a pickup truck 10 is provided with a bumper 11 mounted securely to a suitable frame portion (not shown) of the pickup truck 10. The bumper 11 comprises a pair of spaced elongated box sections 12 interconnected by a longitudinal center plate 13 to which the trailer hitch 15 of this invention is attached. The trailer hitch 15 includes a tapered hitch sleeve 16 provided with mounting plates 17 which are secured to the bumper center plate 13 with nuts and bolts 18. A stud 19, welded to the hitch sleeve 16 is also provided to secure the trailer hitch 15 to the pickup truck 10. It should be understood that various other mounting arrangements can equally well be employed in securing the trailer hitch 15 to the pickup truck 10. As best seen in FIGS. 2, 4 and 6, the hitch sleeve 16 comprises a four-sided tapered tubular member having an enlarged bellmouth opening 20 at a rearwardly extending end thereof and having a reduced dimension opening 21 at a forward end thereof.

A hitch tongue assembly 25 is received within the hitch sleeve 16 having a hollow plug portion 26 with side walls 27 to nest within the hitch sleeve 16 as best seen in FIGS. 3 and 6. Herein, the tapered side walls 27 of the plug portion 26 are complementary to the hitch sleeve 16 to provide a snug rigid interconnection therebetween when a locking pin 29 is inserted through aligned holes 30 and 31 in the sleeve 16 and plug portion 26 respectively. A pair of spaced stop ears 32 abut the bellmouth portion 20 of the hitch sleeve 16 to prevent a binding or wedging between the tapered portions of the tongue assembly and hitch sleeve which could make it difficult to separate them when desired.

A connection tongue 35 is secured to a trailing face 34 of the plug portion 26 as by weldment and is provided with a coupling aperture 37 to receive a coupling pin 38. The coupling pin 38 provides the connection to a tow bar 40 of a trailer 41 or the like. By providing the rigid interconnection between the hitch sleeve 16 and the hitch tongue assembly 25, the tongue 35 may be provided with a coupler ball 42 and the trailer 41 with a ball coupler connector 43 to provide a universal coupling between the truck 10 and the trailer 41 as shown in FIG. 5. Herein, a threaded stud 44 is carried in the aperture 47 and secured by a nut 45 to the tongue 35.

The trailer hitch 15 also includes a winch assembly 50 having a support bracket 48 secured to the mounting plates 17 and the forward end of the hitch sleeve 16. The support bracket 48 rotatably supports a winch drum 51 immediately adjacent the reduced dimension end 21 of the hitch sleeve 16. A wire rope or cable 52 is wound on the drum 51 with one end of the rope extending through a hole in a flange 53 of the drum and clamped about a shaft 54. The shaft 54 rotatably supports the drum 51 in the support bracket 48 with a square socketed end 56 of shaft 54 extending longitudinally below the bumper 11.

As best seen in FIG. 2, a mating square plug drive connection 57 is inserted in the socketed end 56 in a driving connection with an associated shaft 58 extending outward from the shaft 54 longitudinally beyond the bumper 11 to an accessible location at the side of the truck 10.

The shaft 58 is rotatably supported from the bumper 11 by a bracket support 59 and terminates in a square socketed end 60 similar to socket end 56. In some instances, it may be desirable to extend the length of the shaft 54 to the point where it is journalled in the bracket support 59. That is, to combine the shafts 58 and 54 into a single shaft. However, the shaft arrangement shown in the drawings simplifies mounting the trailer hitch 15 to various truck bumpers, wherein the length of shaft 58 may be modified to accommodate specific truck widths. A hand crank 61 having a plug drive connection 62 is readily insertable into the socket end 60 whenever the wire rope 52 is to be wound up on winch drum 51.

Now with reference to FIG. 4, it will be seen that a second end of the wire rope extends backward from the winch drum 51 through the reduced dimension end 21 of the hitch sleeve 16 and into the hollow plug portion 26 of the hitch tongue assembly 25. A rope clamp 65 is secured to the second rope end and serves to secure the rope 52 to the tongue assembly 25.

In operation, the pickup truck 10 is backed to an approximate coupling position relative to the tow bar 40 of a trailer 41 which may be offset to the right or left of the trailer hitch 15 as well as 20" or more behind the truck 10. Now with the locking pin 29 removed from the trailer hitch 15, the hitch tongue assembly 25 is drawn out of its nesting engagement with the hitch sleeve 16, thereby unreeling the wire rope 52 from the winch drum 51. The tongue assembly 25 is pulled backward to align the coupling aperture 37 of the connecting tongue 35 with corresponding holes in the trailer tow bar 40 and the coupling pin 38 is then inserted through the aligned holes to interconnect the hitch tongue assembly with the trailer tow bar 40, as shown in FIGS. 4 and 7.

After the tongue is coupled to the tow bar, the crank 61 is inserted into the socketed end 60 of the shaft 58 and the wire rope 52 is reeled in on the winch drum 51, thereby winching the attached trailer toward the hitch 15. The angled walls of the hitch sleeve 16 guide the rope onto the drum while a pair of cable guides 67 facilitate retaining the cable on the drum. The tapered hitch sleeve 16 cooperates with the tapered plug portion 26 during final winding-in of the cable to guide the hitch tongue assembly 25 into a nesting and keyed engagement with the hitch sleeve 16 as shown in FIG. 3. Thus, the trailer tow bar 40 is winched forward and into alignment relative to the trailer hitch 15, whereupon the locking pin 29 is inserted through the aligned holes 30 and 31 to achieve a strong rigid interconnection between the sleeve 16 and the hitch tongue assembly 25. Cotter pins 68 and 69 are preferably utilized to retain the pins 29 and 38 in place.

If the trailer 41 is equipped with a ball coupler connection as shown in FIG. 5, the same general procedure is followed as described above except obviously the coupler ball 42 and ball coupler 43 interconnect the hitch tongue assembly 25 and trailer tow bar 40 instead of the coupling pin 38.

While the invention has been described in connection with an exemplary embodiment thereof, it will be understood that many modifications will be apparent to those of ordinary skill in the art and that this application is intended to cover any adaptations or variations thereof as may properly be included within the scope of applicants' contribution to the art.

I claim:

1. A heavy duty trailer hitch for coupling a trailing vehicle to a towing vehicle comprising:
   a tapered sleeve means rigidly secured to said haulage vehicle and having an extended tapered portion with an enlarged bellmouth opening at one end thereof and a reduced dimension opening at a second end thereof;
   said bellmouth opening having opposed faces diverging outwardly from said extended tapered portion, a winch means positioned adjacent said tapered sleeve means and including a cable drum being rotatably supported at said second end of said tapered sleeve means;

a cable means having one end thereof extending through said second end of said tapered sleeve means and being windable on said cable drum, said cable means having a second end extendable outward through said enlarged bellmouth opening of said tapered sleeve means; means to wind up said cable means on said cable drum; and a trailer connector means secured to said second end of said cable means and having tapered faces thereon adapted to nest within said tapered portion of said tapered sleeve means in a complementary orientation and including spaced stop means having limited abutting surfaces to abut complementary spaced portions on said opposed faces of said bellmouth opening to provide a predetermined non-binding, nesting penetration of said trailer connector means into said tapered sleeve means wherein a coupling pin is installed to retain said trailer connector means in said nesting relationship with said tapered sleeve means in a rigid towing assembly and further adapted to be outwardly extensible from said tapered sleeve means whereby said trailer connector means may be coupled to said trailing vehicle by unreeling said cable means from said cable drum to position said trailer connector means in a coupling orientation with said trailing vehicle and thereafter said trailer connector means is drawn into the nesting relationship with said tapered sleeve means by reeling in said cable means on said cable drum whereby said bellmouth serves to guide said cable means, and said trailer connector means into said tapered sleeve means to provide said rigid towing assembly.

2. The heavy duty trailer hitch according to claim 1, wherein said means to wind up said cable means includes a drive shaft connected to said cable drum and extending laterally outward from between said towing and trailing vehicles to an accessible position and further includes a hand crank being connectible to said drive shaft to rotatably drive said cable drum to reel in said cable means whereby said trailer connector means is brought into said nesting relationship with said tapered sleeve means.

3. The heavy duty trailer hitch according to claim 2, wherein said trailer connector means includes a hitch tongue being swivelably connectible to said trailing vehicle.

4. The heavy duty trailer hitch according to claim 2, wherein said trailer connector means includes a coupler ball being connectible to said trailing vehicle for universal movements therebetween.

5. A highway trailer hitch having a coupling assist for connecting a trailing vehicle to a towing vehicle including:

a trailer connection means having tapered side walls and being securable to a trailing vehicle;

a support means rigidly secured to said towing vehicle; means to receive said trailer connection means in a rigid complementary nested orientation comprising a tapered sleeve means and being carried on said support means;

a cable winch means rotatably carried on said support means in alignment with said means to receive said trailer connection means;

cable means connected between said trailer connection means and said cable winch means; and means to drive said cable winch means to wind or unwind cable from said cable winch means whereby said trailer connection means may be rearwardly extensible with said cable means to couple said trailer connection means to said trailing vehicle which is remote from said towing vehicle and thereafter said trailer connection means is retractible into said rigid nested orientation relative to said means to receive said trailer connection means by winding said cable means onto said winch means;

said means to receive said trailer connection means includes a guide means comprising an enlarged bellmouth to guide said cable means and said trailer connection means into said rigid nested orientation, said trailer connection means includes spaced stop members adapted to abut complementary spaced surfaces on said bellmouth to provide a non-wedging orientation between said tapered sleeve means and said tapered side walls of said trailer connection means.

6. The highway trailer hitch according to claim 5, wherein a coupling pin retains said trailer connection means in said rigid nested orientation.

7. The highway trailer hitch according to claim 5, wherein said means to drive said cable winch means includes a drive shaft extending laterally outward from said cable winch means to an accessible position and further includes a hand crank being connectible to said drive shaft to rotatably drive said cable winch means to wind in said cable means whereby said trailer connection means is pulled into said nesting relationship relative to said means to receive said trailer connection means.

8. The highway trailer hitch according to claim 7, whereby said trailer connector means includes a hitch tongue being swivelably connectible to said trailing vehicle.

9. The highway trailer hitch according to claim 7, whereby said trailer connector means includes a coupler ball being connectible to said trailing vehicle for universal movements therebetween.

* * * * *